United States Patent
Hutchinson et al.

(10) Patent No.: US 12,098,763 B2
(45) Date of Patent: Sep. 24, 2024

(54) DRIVE ASSEMBLY

(71) Applicant: Schaeffler Technologies AG & Co. KG, Herzogenaurach (DE)

(72) Inventors: Kevin Hutchinson, Charlotte, NC (US); Chris Hutchison, Gastonia, NC (US); Perry Hollen, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/165,604

(22) Filed: Feb. 7, 2023

(65) Prior Publication Data

US 2024/0263695 A1 Aug. 8, 2024

(51) Int. Cl.
*F16H 57/021* (2012.01)
*F16C 35/063* (2006.01)
*F16H 57/023* (2012.01)
*F16H 1/14* (2006.01)

(52) U.S. Cl.
CPC ......... *F16H 57/021* (2013.01); *F16C 35/063* (2013.01); *F16H 57/023* (2013.01); *F16H 1/14* (2013.01)

(58) Field of Classification Search
CPC ........ F16H 57/021; F16H 57/023; F16H 1/14; F16C 35/063
See application file for complete search history.

(56) References Cited

U.S. PATENT DOCUMENTS

2018/0128320 A1\* 5/2018 Chaussat .................. G01D 5/12

FOREIGN PATENT DOCUMENTS

CN 112628385 A \* 4/2021
DE 202022102245 U1 \* 9/2022

\* cited by examiner

*Primary Examiner* — Zakaria Elahmadi
(74) *Attorney, Agent, or Firm* — Volpe Koenig

(57) ABSTRACT

A drive assembly including a housing having an opening, a shaft supported for rotation by a bearing assembly received in the opening of the housing, and at least one gear fixed for rotation with the shaft. The bearing assembly includes a bearing that is axially fixed to the shaft, and a sleeve having a tubular section, a radially inwardly extending flange at a first end of the tubular section and a radially outwardly extending flange at a second end of the tubular section. The bearing is received in the tubular section and abuts at least a portion of the tubular section and the radially inwardly extending flange. The radially outwardly extending flange abuts a surface of the housing surrounding the opening of the housing thereby setting an axial position of the at least one gear relative to the opening of the housing.

9 Claims, 2 Drawing Sheets

DRIVE ASSEMBLY

FIELD OF INVENTION

The present disclosure relates generally to drive assemblies. More particularly, the present disclosure relates to a bearing assembly for supporting a shaft of a drive assembly.

BACKGROUND

A wide variety of drive assemblies are known. One type of drive assembly includes an input shaft supported for rotation by one or more bearings in a bore of a housing. One or more gears are fixed for rotation to the shaft for driving other components, such as cooperating gears/shafts, etc. In such assemblies, the axial position of the shaft relative to the housing ensures proper meshing between the gears of the shaft and corresponding driven elements. To achieve proper positioning, the bore of the housing is typically provided with additional features such as a machined shoulder or snap ring groove which sets the axial position of the shaft relative to the housing. These additional features increase costs and/or assembly time.

SUMMARY

In accordance with one aspect of the present disclosure, a drive assembly comprises a housing having an opening, a shaft supported for rotation by a bearing assembly received in the opening of the housing, and at least one gear fixed for rotation with the shaft. The bearing assembly includes a bearing that is axially fixed to the shaft, and a sleeve having a tubular section, a radially inwardly extending flange at a first end of the tubular section and a radially outwardly extending flange at a second end of the tubular section. The bearing is received in the tubular section and abuts at least a portion of the tubular section and the radially inwardly extending flange. The radially outwardly extending flange abuts a surface of the housing surrounding the opening of the housing thereby setting an axial position of the at least one gear relative to the opening of the housing.

The at least one gear can include a bevel gear, and the sleeve can resist a separation force generated by the bevel gear along an axis of the shaft. The bearing assembly can include an angular contact ball bearing. The angular contact ball bearing can include an inner race, an outer race, a cage supported between the inner race and the outer race, and a plurality of rolling elements retained by the cage, inner race and outer race. The sleeve can be a unitary, one-piece structure, such as a stamped metal structure. The tubular section of the sleeve can have an axial length greater than an axial length of the bearing. The radially outwardly extending flange of the sleeve can be spaced axially from the bearing. The bearing of the bearing assembly can support a terminal end portion of the shaft.

In accordance with another aspect of the present disclosure, a bearing assembly comprises a bearing, and a sleeve having a tubular section, a radially inwardly extending flange at a first end of the tubular section and a radially outwardly extending flange at a second end of the tubular section. The bearing is received in the tubular section and abuts at least a portion of the tubular section and the radially inwardly extending flange.

The bearing can be an angular contact ball bearing, including an inner race, an outer race, a cage supported between the inner race and the outer race, and a plurality of rolling elements retained by the cage, inner race and outer race. The sleeve can be a unitary, one-piece structure, such as a stamped metal structure. The tubular section of the sleeve can have an axial length greater than an axial length of the bearing. The radially outwardly extending flange of the sleeve can be spaced axially from the bearing.

In accordance with another aspect of the present disclosure, a method of assembling components of a drive assembly comprises providing a housing having an opening, providing a shaft and a bearing assembly mounted to the shaft, the bearing assembly including a bearing, and a sleeve having a tubular section, a radially inwardly extending flange at a first end of the tubular section and a radially outwardly extending flange at a second end of the tubular section, wherein the bearing is received in the tubular section and abuts at least a portion of the tubular section and the radially inwardly extending flange, and inserting the shaft and bearing assembly into the opening of the housing such that the radially outwardly extending flange abuts a surface of the housing surrounding the opening of the housing thereby setting an axial position of the shaft relative to the opening of the housing.

Additional embodiments are disclosed herein.

BRIEF DESCRIPTION OF THE DRAWINGS

The foregoing Summary and the following Detailed Description will be better understood when read in conjunction with the appended drawings, which illustrate an embodiment of the disclosure. In the drawings.

DETAILED DESCRIPTION

Figure 1:
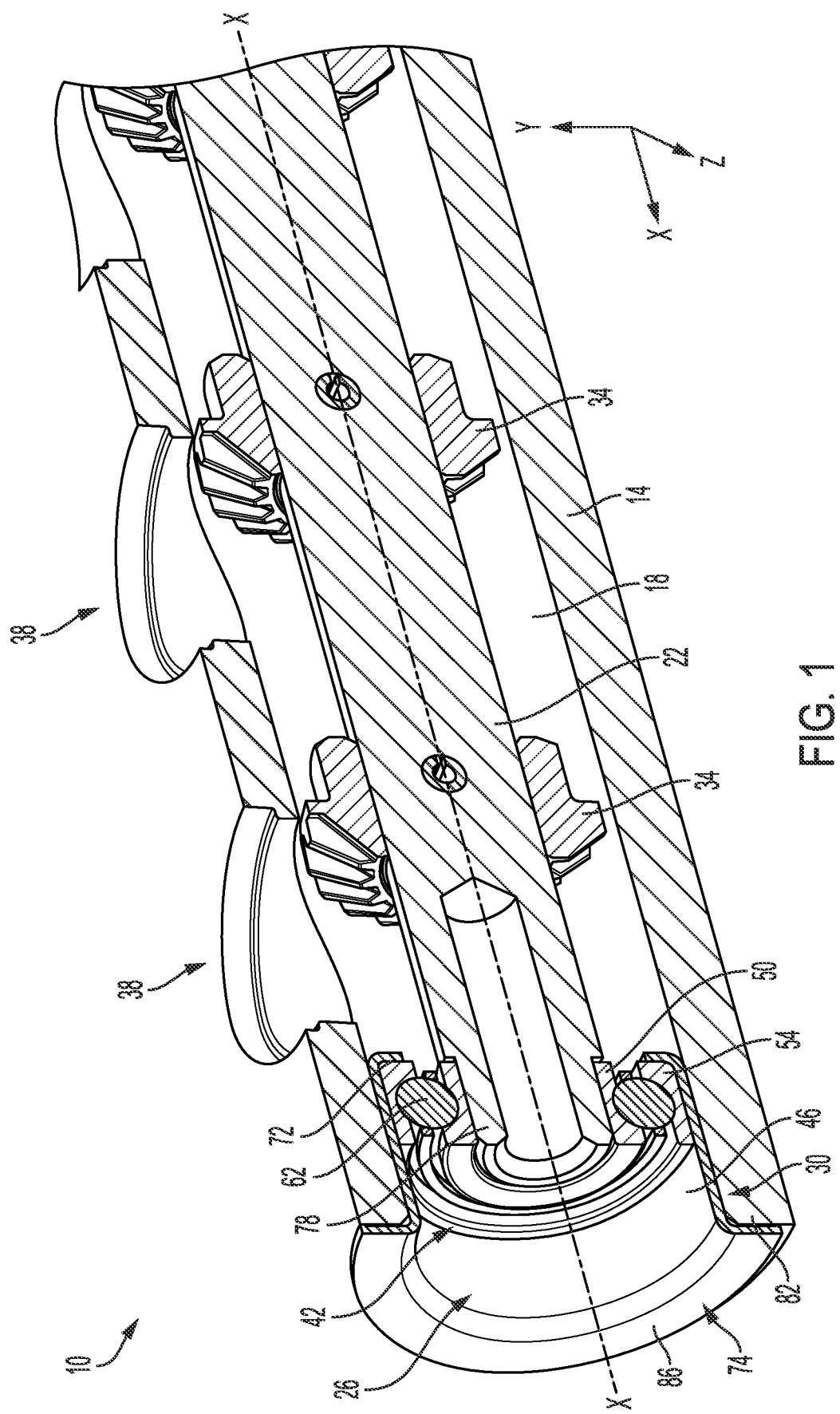
FIG. 1 is a cutaway perspective view of an exemplary drive assembly in accordance with the present disclosure.

Certain terminology is used in the following description for convenience only and is not limiting. "Axially" refers to a direction along an axis (X), as shown in FIG. 1, for example. "Radially" refers to a direction inward and outward from the axis (X) of the connector, i.e. in the "Y" direction as shown in FIG. 1, for example.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

FIG. 1 illustrates an exemplary drive assembly in accordance with the present disclosure and identified generally by reference numeral 10. The drive assembly 10 includes a housing 14 having a bore 18 in which a shaft 22 is received. The housing 18 can be, for example, a case of a transmission assembly or other power transmission device. A proximal end of the shaft 22 is supported for rotation by a bearing assembly 26 received in an opening 30 of the housing 14. One or more additional bearings (not shown) may support a distal end of the shaft 22 and/or at intermediate portions thereof.

In the illustrated embodiment, the housing 14 is generally tubular and contains the shaft 22 entirely within the bore 18. In other embodiments, the housing can be a bearing support flange that has an opening for receiving the bearing assembly 26, but otherwise does not include a bore in which the shaft is contained, such that the shaft is at least partially contained in a further housing or open to the environment.

Thus, it should be appreciated that the housing 14 is exemplary in nature and aspects of the present disclosure can be used in a wide variety of installations.

In the illustrated embodiment, the shaft 22 includes at least one, and preferably a plurality of axially-spaced apart bevel drive gears 34. The bevel drive gears 34 are fixed for rotation with the shaft 22 and are configured to engage corresponding bevel driven gear(s) (not shown) mounted to respective driven shafts (not shown) which can be received through shaft openings 38 in the outer circumference of the housing 22. It will be appreciated that other types of gears and/or drive components can be used depending on a particular application.

Figure 2:
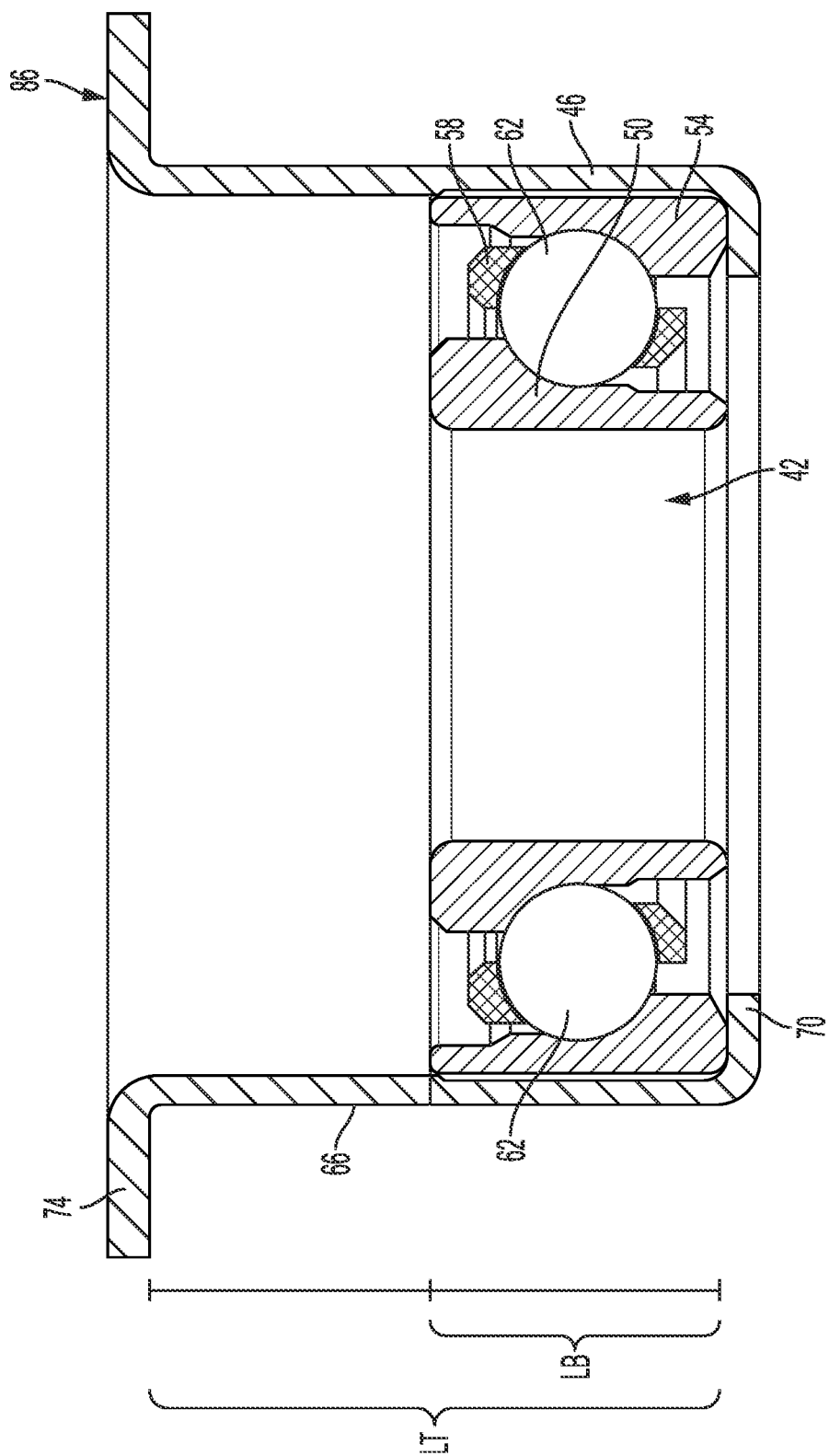
FIG. 2 is a cross-sectional view of an exemplary bearing assembly in accordance with the present disclosure.

With additional reference to FIG. 2, the bearing assembly 26 includes a bearing 42 received in a sleeve 46. The bearing 42, which in the illustrated example is an angular contact bearing, includes an inner race 50, an outer race 54, a cage 58 supported between the inner race 50 and the outer race 54, and a plurality of rolling elements 62 retained by the cage 58, inner race 50 and outer race 54.

The sleeve 46 has a tubular section 66 in which the bearing 42 is received, a radially inwardly extending flange 70 at a first end of the tubular section 66 and a radially outwardly extending flange 74 at a second end of the tubular section 66. In the illustrated example, the bearing 42 is pressed into the sleeve 46 and the outer race 54 abuts at least a portion of the tubular section 66 and the radially inwardly extending flange 70.

The sleeve 46 can be a unitary one-piece structure, such as a stamped metal sleeve, for example. In the illustrated example, the tubular section 66 of the sleeve 46 has an axial length LT greater than an axial length of the bearing LB such that the radially outwardly extending flange of the sleeve is spaced axially from the bearing. In one example, the axial length LT of the tubular section 66 is approximately twice the axial length LB of the bearing 42. The axial length LT can be selected to achieve a desired axial positioning of the shaft 22 within the housing 14.

Referring back to FIG. 1, the bearing 42 of the bearing assembly 26 supports a terminal end portion 78 of the shaft 22. The bearing assembly 26 is typically pressed onto the shaft 22 and fixed axially thereto. The sleeve 46 is received in the opening 30 in the housing 14 such that the radially outwardly extending flange 74 abuts a surface 82 of the housing 14 surrounding the opening 30 of the housing 14 thereby setting an axial position (e.g., depth) of the bevel drive gears 34 relative to the opening 30 of the housing 14. As such, special features such as shoulders or snap ring grooves are not required in the bore 18 of the housing.

A person of skill in the art will recognize that when the bevel drive gears 34 are mated with corresponding bevel driven gears (not shown) and the shaft 22 is rotated, a gear separation force is generated along the axis of the shaft 22 in a direction away from the bearing assembly 26. This gear separation force is resisted by the sleeve 46 due to the abutting engagement of the radially outwardly extending flange 74 with the housing 14 such that axial movement of the bearing assembly 26 and shaft 22 is restricted.

In certain applications, the radially outwardly extending flange 74 can act as a wear surface between the housing 14 and an adjacent component. To this end, certain low friction materials can be coated or otherwise applied to an outwardly-facing surface 86 of the radially outwardly extending flange 74.

Aspects of the present disclosure simplify installation of the shaft 22, bearing assembly 26, and bevel drive gears 34 in the bore 18 of the housing 14. In particular, the shaft 22 with bearing assembly 16 and bevel drive gears 34 can be inserted into the bore 18 until the radially outwardly extending flange 74 bottoms on the surface 82 of the housing 14 surrounding the opening 30. In this position, the bevel drive gears 34 are aligned axially within the bore 18 for meshing with bevel drive gears (not shown) received through openings 38 in the housing 14. No additional installation steps are necessary, such as the installation of a retaining ring in the bore 18.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of an embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS drive assembly 10
housing 14
bore 18
shaft 22
bearing assembly 26
opening 30
bevel drive gears 34
shaft openings 38
bearing
sleeve 46
inner race 50
outer race 54
cage 58
rolling elements 62
tubular section 66
radially inwardly extending flange 70
radially outwardly extending flange 74
axial length of the tubular section LT
axial length of the bearing LB
terminal end portion of the shaft 78
surface 82
outwardly-facing surface 86

The invention claimed is:

1. A drive assembly comprising:
a housing having a bore;
a shaft supported for rotation in the bore by a bearing assembly received in a first opening of the housing; and
at least one gear fixed for rotation with the shaft;
a second opening of the housing extending perpendicular from the bore to an exterior of the housing, the second opening spaced axially from the first opening;
wherein the bearing assembly includes:
a bearing that is axially fixed to the shaft; and
a sleeve having a tubular section, a radially inwardly extending flange at a first end of the tubular section and a radially outwardly extending flange at a second end of the tubular section;

wherein the bearing is received in the tubular section and abuts at least a portion of the tubular section and the radially inwardly extending flange; wherein the radially outwardly extending flange abuts a surface of the housing surrounding the first opening of the housing thereby setting an axial position of the at least one gear relative to the first opening of the housing;

wherein the at least one gear is aligned axially in the bore with the second opening;

wherein the at least one gear includes a bevel gear, and wherein the sleeve resists a separation force generated by the bevel gear along an axis of the shaft away from the bearing.

2. The drive assembly according to claim 1, wherein the bearing assembly includes an angular contact ball bearing.

3. The drive assembly of claim 2, wherein the angular contact ball bearing includes:
   an inner race;
   an outer race;
   a cage supported between the inner race and the outer race; and
   a plurality of rolling elements retained by the cage, inner race and outer race.

4. The drive assembly according to claim 1, wherein the sleeve is a unitary, one-piece structure.

5. The drive assembly according to claim 4, wherein the sleeve is a stamped metal structure.

6. The drive assembly according to claim 1, wherein the tubular section of the sleeve has an axial length greater than an axial length of the bearing.

7. The drive assembly according to claim 6, wherein the radially outwardly extending flange of the sleeve is spaced axially from the bearing.

8. The drive assembly according to claim 7, wherein the bearing of the bearing assembly supports a terminal end portion of the shaft.

9. A method of assembling components of a drive assembly comprising:
   providing a housing having a bore extending between a first opening and a second opening perpendicular to the bore extending to an exterior of the housing;
   providing a shaft and a bearing assembly mounted to the shaft, the bearing assembly including a bearing, and a sleeve having a tubular section, a radially inwardly extending flange at a first end of the tubular section and a radially outwardly extending flange at a second end of the tubular section, wherein the bearing is received in the tubular section and abuts at least a portion of the tubular section and the radially inwardly extending flange, the shaft having at least one gear fixed for rotation with the shaft and spaced axially from the bearing assembly; and
   inserting the shaft and bearing assembly into the bore of the housing such that the radially outwardly extending flange abuts a surface of the housing surrounding a first opening of the housing thereby setting an axial position of the shaft relative to the bore of the housing such that the at least one gear is aligned axially with the second opening;
   wherein the at least one gear includes a bevel gear, and wherein the sleeve resists a separation force generated by the bevel gear along an axis of the shaft away from the bearing.

* * * * *